(12) United States Patent
Bourgeois et al.

(10) Patent No.: US 9,030,915 B2
(45) Date of Patent: May 12, 2015

(54) SYSTEM AND METHOD FOR SWATH OVERLAP DETECTION

(75) Inventors: Brian S Bourgeois, Slidell, LA (US); Lewis F. Jones, III, Hattiesburg, MS (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 497 days.

(21) Appl. No.: 13/603,642

(22) Filed: Sep. 5, 2012

(65) Prior Publication Data

US 2014/0064031 A1    Mar. 6, 2014

(51) Int. Cl.
*G01S 15/89* (2006.01)
*G01S 7/53* (2006.01)

(52) U.S. Cl.
CPC .. *G01S 15/89* (2013.01); *G01S 7/53* (2013.01)

(58) Field of Classification Search
CPC .................................. G01S 7/53; G01S 15/89
USPC ........................................................... 367/88
See application file for complete search history.

(56) References Cited

U.S. PATENT DOCUMENTS

| 6,144,778 | A  | * | 11/2000 | Beauchamp et al. | 382/318 |
| 7,002,572 | B1 | * | 2/2006  | Teig et al.      | 345/420 |
| 7,595,725 | B1 | * | 9/2009  | Joseph et al.    | 340/995.1 |
| 2004/0211071 | A1 | * | 10/2004 | Su           | 33/1 AP |
| 2009/0005968 | A1 | * | 1/2009  | Vengroff et al. | 701/202 |
| 2014/0064031 | A1 | * | 3/2014  | Bourgeois et al. | 367/88 |

* cited by examiner

*Primary Examiner* — Daniel Pihulic
(74) *Attorney, Agent, or Firm* — US Naval Research Laboratory; Kathleen Chapman (57) ABSTRACT

System and method for rapidly determining the geographic areas where spatial overlap of arbitrarily oriented (i.e. not just parallel) swath sensor data meets a pre-selected specified percentage of swath width.

18 Claims, 8 Drawing Sheets

SYSTEM AND METHOD FOR SWATH OVERLAP DETECTION

CROSS-REFERENCE TO RELATED APPLICATIONS

None.

BACKGROUND

Swath sensors (such as sidescan sonar, bathymetry sonar, camera, etc.) have a 'swath width' that is a function of the angular sector of the sensor and the distance to the surface being observed. Sidescan sonar is an acoustic system that can image the seafloor. Sidescan sonar sensor data can be made available in at least one standard format, Unified Sonar Image Processing System (UNISIPS). Often these sensors are moved along at a nearly constant height above the surface that is being observed and at a nearly uniform speed. The resulting data forms 'swaths' over the surface being observed that is nominally constant in width. When multiple passes are made with the sensor over the same geographic areas overlap occurs between the swaths created at different times. A sufficient overlap is desirable to examine features being observed from different orientations of the sensor and/or at different times. The swath sensor data sets are typically very large and processing (manually or automatically) can require extensive resources. The effort can be reduced significantly by eliminating those areas without sufficient overlap.

The existing tools for looking through sidescan sonar data include the ability to scroll through the data sequentially, a process that can take longer than the data collection process itself. Simple graphical methods to determine the overlap between polygons do not address the unique issue of 'sufficient' overlap to properly cull areas that can be ignored.

SUMMARY

The system and method of the present embodiment can rapidly determine the geographic areas where spatial overlap of arbitrarily oriented (i.e. not just parallel) swath sensor data meets a pre-selected specified percentage of swath width. The unique elements of the present teachings are: (1) a system and method for defining overlap polygons using individual ping edges; (2) a system and method for computing percent overlap using the edge points and the knowledge of which source polygon contributed the edge point; and (3) the use of a non-degenerate point to line distance computation. By using the system and method of the present teachings, areas of sonar imagery that do not require processing by manual or automated methods can be culled out. Among other uses, the system and method of the present embodiment can be used to support crisis response to mining, industrial, or natural disaster events by quickly detecting changes in the seafloor. Harbors, where sidescan sonar imagery surveys are routinely done, can use this technology to reduce the cost of data analysis and to provide evidence required for insurance claims or FEMA claims after terrorist incidents or natural disasters.

The method of one embodiment of the present teachings for choosing geographic regions of data in which to analyze features can include, but is not limited to including, the steps of (a) automatically filtering the data; (b) automatically determining end points of a navigation track based on the filtered data; (c) automatically extracting edge points from the filtered data based on navigation track end points; (d) automatically creating original polygons using positions of the edge points, the original polygons each having a swath width; (e) automatically determining overlap polygons as the spatial intersection of the original polygons, two at a time, with each other, the overlap polygons retaining a subset of the edge points of each of the original polygons; (f) automatically computing a first overlap percentage for each of the overlap polygons with a first of the two original polygons including the steps of: (1) for the first of the original polygons, automatically computing the distances from each point in the overlap polygon that belongs to the second of the original polygons to both of the edges of the first of the original polygons; (2) automatically choosing the maximum of the distances; and (3) automatically dividing the maximum of the distances by the swath width of the first of the original polygons; (g) automatically computing a second overlap percentage for each of the overlap polygons with a second of the two original polygons by (1) for the second of the original polygons, automatically computing the distances from each point in the overlap polygon that belongs to the first of the original polygons to both of the edges of the second of the original polygons; (2) automatically choosing the maximum of the distances; and (3) automatically dividing the maximum of the distances by the swath width of the second of the original polygons; (h) automatically computing an overlap percentage of the overlap polygon of the maximum of the first overlap percentage and the second overlap percentage; (i) automatically storing the overlap polygon if the overlap percentage is at least equal to a pre-selected percentage; (j) automatically repeating steps (f)-(i) for each pair of the original polygons in the data; and (k) automatically analyzing features in the data corresponding to the locations of the stored overlap polygons. The step of computing the distances can optionally use a non-degenerate method for computing the distances. The end points can optionally include a begin time and an end time of the navigation track of a ship. The positions of the edge points can optionally be locations based on the navigation track, the depth of the ocean below the navigation track, and the time when the edge points are each sensed. The step of filtering can optionally include the steps of breaking the data up into linear segments and eliminating the turns from the navigation tracks. The step of extracting edge points can optionally include the steps of locating the edge points that are the furthest away from the navigation track and omitting the navigation tracks having a number of consecutive edge points below a pre-selected ping threshold.

A second embodiment of the method of the present teachings for locating geographic areas where spatial overlap of swath sensor data meets a pre-selected amount of swath width can include, but is not limited to including, the steps of (a) automatically reducing scan lines by removing turn data and roll excursion data from the sensor data; (b) automatically identifying a contiguous series of the reduced scan lines having less than a pre-selected amount of yaw and roll; (c) automatically computing edge point positions for each of the reduced scan lines to create original polygons for each of the contiguous series of the reduced scan lines, the original polygons having a series of edge points along opposite edges of the original polygon; (d) automatically computing overlap polygons by ANDing two of the original polygons, the overlap polygons including overlap polygon edge points from a subset of the edge points of the two original polygons; (e) automatically computing first projection distances from each of the overlap polygon edge points along a perpendicular to the lines defining each edge of a first of the two polygons to the edge points of the first of the two polygons; (f) automatically computing a first overlap percentage based on the maximum of the first projection distances and the length of the line connecting the opposite edges of the first of the two polygons; (g) automatically computing second projection distances from each of the overlap polygon edge points along a perpendicular to the lines defining each edge of a second of the two polygons to the edge points of the second of the two polygons; (h) automatically computing a second overlap percentage based on the maximum of the second projection distance and the length of the line connecting the opposite edges of the second of the two polygons; (i) automatically choosing a maximum overlap percentage from the first overlap percentage and the second overlap percentage; and (j) automatically locating the geographic areas based on the maximum overlap percentage and the pre-selected amount of swath width.

A second embodiment of the method of the present teachings for examining seafloor features can include, but is not limited to including, the steps of (a) automatically reducing scan lines by removing turn data and roll excursion data from sensor data; (b) automatically identifying a contiguous series of the reduced scan lines having less than a pre-selected amount of yaw and roll; (c) automatically computing end positions for each of the reduced scan lines to create a polygon for each of the contiguous series of the reduced scan lines, the polygon having a series of edge points along opposite edges of the polygon; (d) automatically computing overlap polygons by ANDing two of the polygons, the overlap polygons having overlap edge points from a subset of the edge points of the two polygons; (e) automatically computing first projection distances from each of the overlap edge points to the edge points of a first of the two polygons; (f) automatically computing a first overlap percentage based on the maximum of the first projection distances and the length of the line connecting the opposite edges of the first of the two polygons; (g) automatically computing second projection distances from each of the overlap edge points to the edge points of a second of the two polygons; (h) automatically computing a second overlap percentage based on the maximum of the second projection distance and the length of the line connecting the opposite edges of the second of the two polygons; (i) automatically choosing a maximum overlap percentage from the first overlap percentage and the second overlap percentage; and (j) automatically examining the seafloor features within the area covered by the overlap polygons when the maximum overlap percentage reaches a pre-selected threshold.

DETAILED DESCRIPTION

The problems set forth above, as well as further and other problems, are solved by the present teachings. These solutions and other advantages are achieved by the various embodiments of the teachings described herein below.

An imagery file, for example, but not limited to, a UNISIPS acoustic imagery file, contains a three series of individual acoustic 'ping' records. Each ping record can contain the location of the vessel position at that time, heading pitch, roll, etc. and the port and starboard 'pixels' formed by the received acoustic intensity. The width of each ping is determined from the file using the pixel size (across track) and the number of pixels (columns). Using the navigation data in the UNISIPS files, sections of data in turns are omitted from the process that follows since the imagery is adversely impacted and typically not useable. Likewise, large roll excursions also render the imagery unusable.

Figure 1:
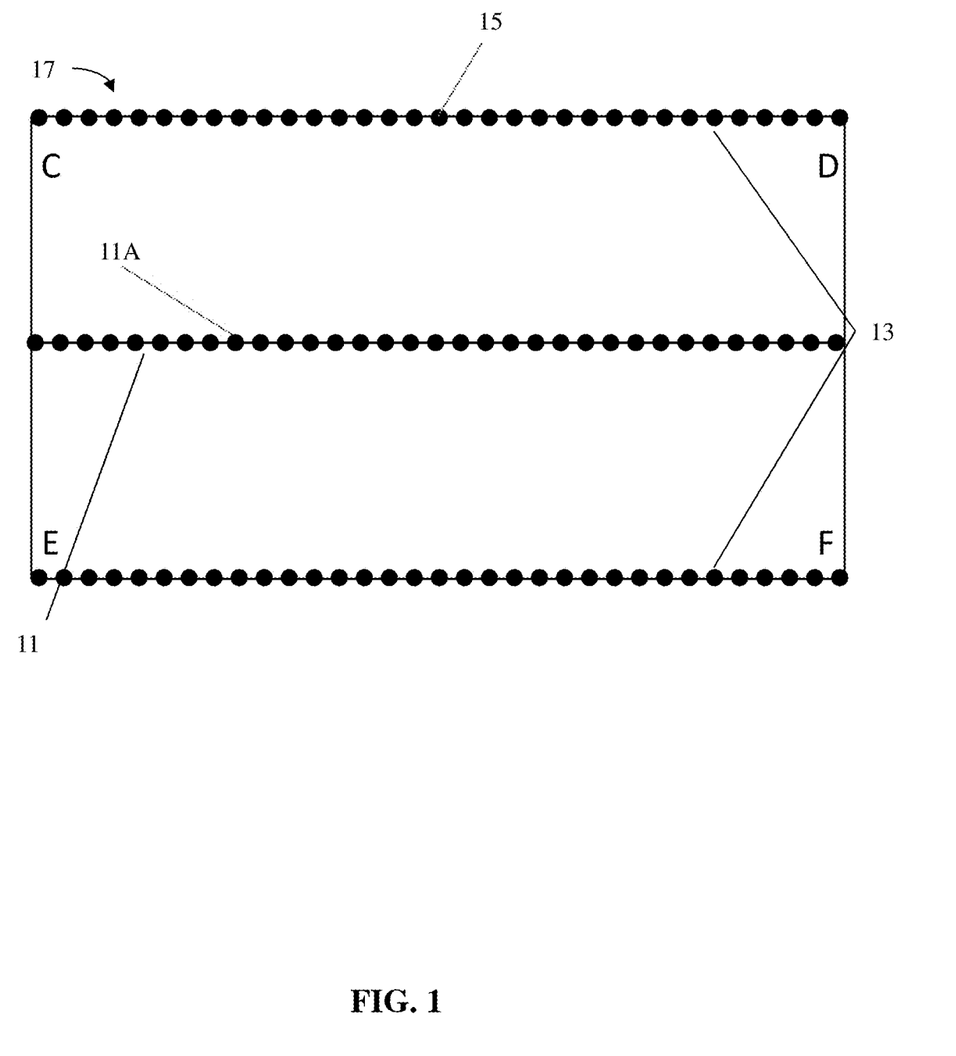
FIG. 1 is graphic diagram of a created original polygon having a navigation track running through the polygon and edge points on selected perimeter locations of the polygon.

Referring now to FIG. 1, going through the UNISIPS file, a contiguous series of scan lines can be found that do not include scanlines with excessive yaw or roll. Polygons can be created for each contiguous group by computing the end positions of each scanline. Vessel position 11 is shown at each scanline time. Scanline edges 13 represent the maximum extent of each scanline and the sequence of edge points (shown as dots) 15 around polygon (shown here, but not limited to, a rectangle) 17 form the vertices for the mathematical representation of the polygons. Lines determining the two edges of the swath are defined by endpoints C,D and E,F as shown. A threshold that can be defined as the minimum number of consecutive scanlines can be used, for example, to prevent making polygons that are too short to be useful. In the present embodiment, any polygon that represents less than a pre-selected number of scanlines, for example, but not limited to, 100 scanlines, is ignored.

It is not necessary for the width of each scanline, which depends upon the type of sensor, the mode it is operated in, the height off of the bottom, the roughness of the terrain, etc., to be constant. In the present embodiment, the width of the pixels in the created polygons are assumed to be nominally the same.

Figure 2:
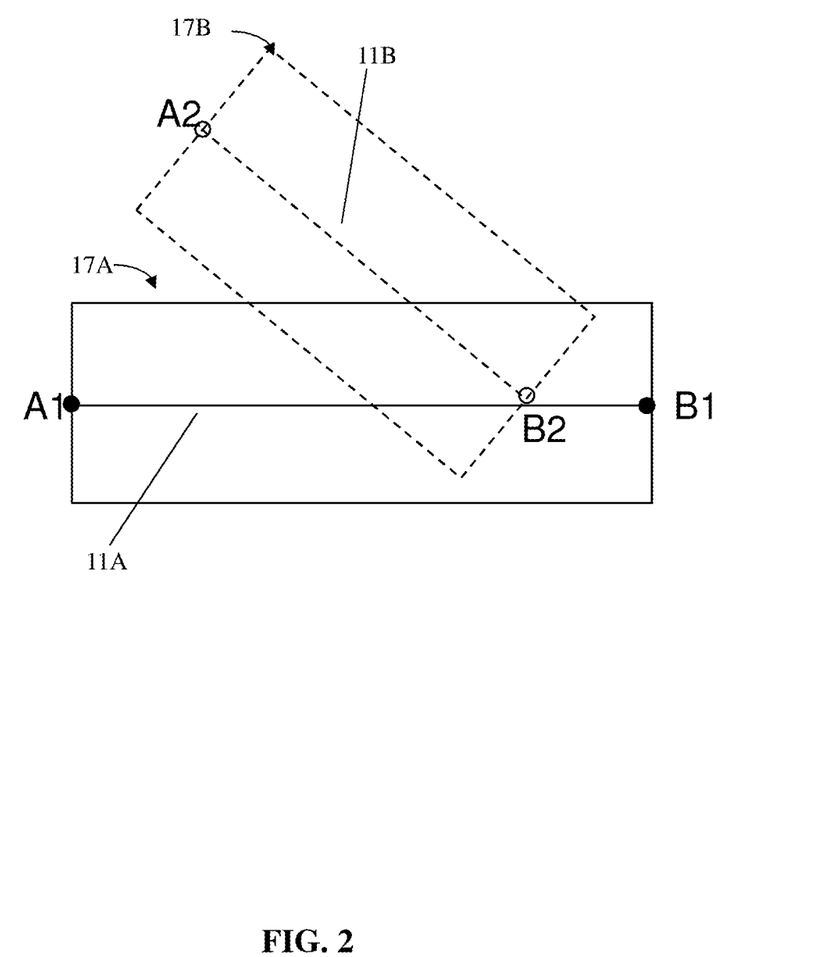
FIG. 2 is a graphic diagram of the intersection of two of the original polygons.

The group of polygons that are thus created are examined two at a time to determine possible overlap combinations. A possible method, though not limited to this method, to determine that any two polygons do not overlap is accomplished by examining their maximum and minimum corners:

$X1_{max} < X2_{min}$ AND $X1_{min} > X2_{max}$ $Y1_{max} < Y2_{min}$ AND $Y1_{min} > Y2_{max}$ Referring now to FIG. 2, first original polygon 17A and second original polygon 17B overlap. Center line 11A is defined by a vessel's position at first vehicle first scanline A1 and first vehicle last scanline B1 in a sequence of scanlines associated with the vessel's movement. Second center line 11B is defined by a vessel's position at second vehicle first scanline A2 and second vehicle last scanline B2 in a sequence of scanlines associated with the vessel's movement.

Figure 3:
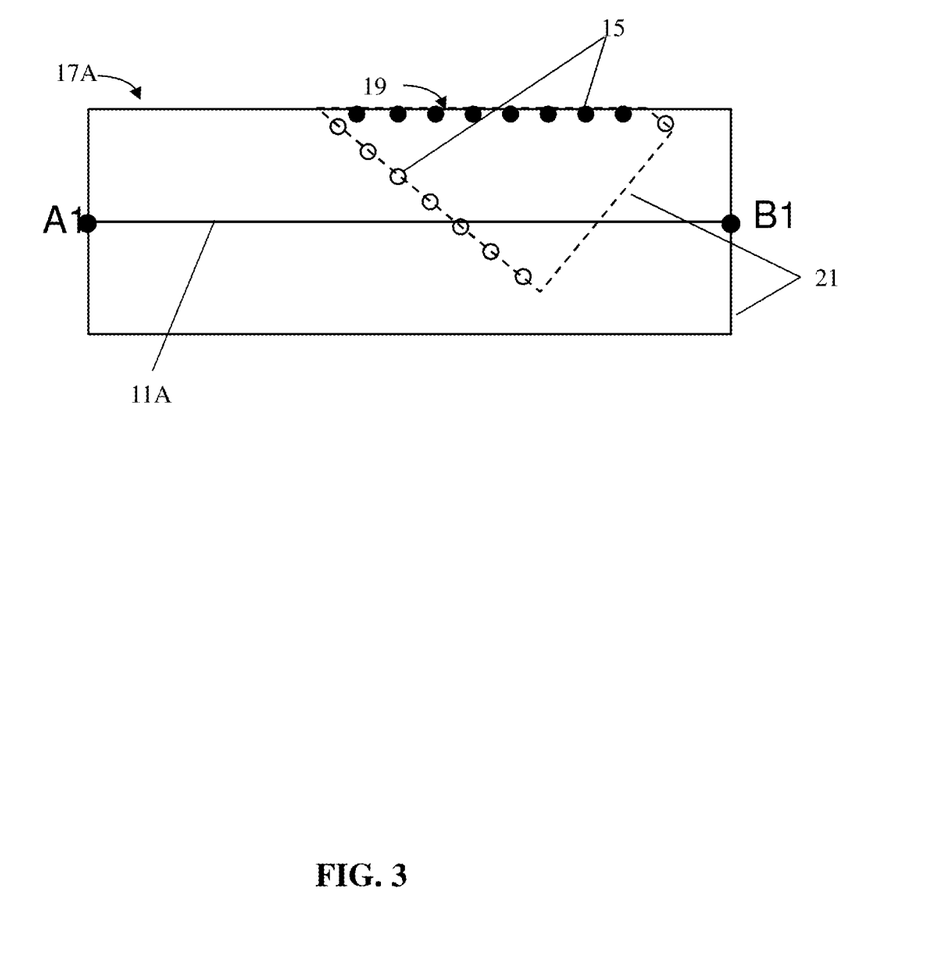
FIG. 3 is a graphic diagram of an overlap polygon having edge points from each of the two original polygons.

Referring now to FIG. 3, overlap polygon 19 can be created by performing a standard graphics ANDing function on first original polygon 17A (FIG. 2) and second original polygon 17B. Overlap polygon 19 is defined by edge points 15 contributed from first original polygon 17A (FIG. 2) and second original polygon 17B. Note that there are no polygon vertices on the ends 21 of each polygon. Overlap polygon 19 includes edge points 15 contributed from first original polygon 17A (FIG. 2) and second original polygon 17B. The use of edge points 15 to create overlap polygon 19, and the knowledge of which of first original polygon 17A (FIG. 2) and second original polygon 17B each of edge points 15 came from enables the overlap computation approach of the present embodiment.

To compute the overlap percentage, the x-coordinates of first vehicle first scanline A1 and first vehicle last scanline B1 in, for example, first original polygon 17A are compared to determine if center line 11A is vertical. If center line 11A is not vertical, the slope m is found for center line 11A by using the coordinates of first vehicle first scanline A1 and first vehicle last scanline B1. The y-intercept b is found by using coordinates from one of first vehicle first scanline A1 and first vehicle last scanline B1 and the slope m.

Slope $m=(A_y-B_y)/(A_x-B_x)$

Intercept $b=A_y-(m*A_x)$

The distance between the first vehicle first scanline A1 and first vehicle last scanline B1 in, for example, first original polygon 17A is calculated for use in later calculations.

$Distance_{center}=sqrt((A_x-B_x)^2+(A_y-B_y)^2)$

Figure 4:
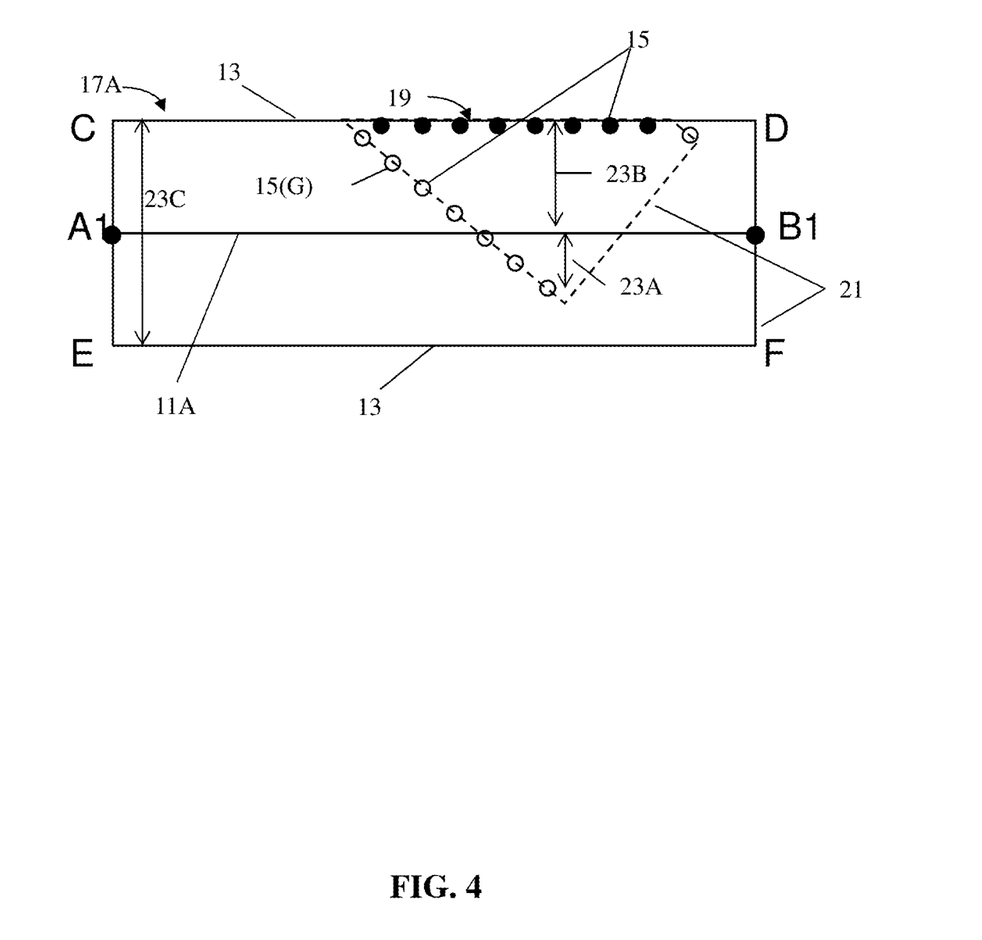
FIG. 4 is a graphic diagram of distance computation parameters derived for a distance computation for the overlap polygon within one of the original polygons.

Referring now to FIG. 4, edge point 15 (G) of overlap polygon 19 is tested to see if it is located on center line 11A. This is determined by either comparing edge point 15 (G) with the slope and y-intercept of center line 11A if center line 11A were not found to be vertical, or by comparing the x-coordinate of edge point 15 (G) to the x-coordinate of one of first vehicle first scanline A1 or first vehicle last scanline B1 of center line 11A if center line 11A were found to be vertical. If edge point 15 (G) is located on center line 11A then it is skipped.

Center Line is Not Vertical $y=(m*G=G_x)+b$

Center Line is Vertical $G_x==B_x?$ $G_y=y?$

If edge point 15 (G) is not on center line 11A, the edge point (G) is either above or below center line 11A. If center line 11A is vertical, then left and right are treated as above and below since the true direction is arbitrary.

Center Line is Not Vertical isAbove=$G_y$>y is

Center Line is Vertical isAbove=$G_x$>$B_x$

Continuing to refer to FIG. 4, to compute the distance from each of edge points 15 in overlap polygon 19 to center line 11A in first original polygon 17A (but could be in either of the original polygons):

temp=abs((($B_x-A_x$)*($A_y-G_y$))-(($A_x-G_x$)*($B_y-A_y$)))

Distance=temp/ $Distance_{center}$

If edge point 15 (G) is above center line 11A then the distance is treated as a positive number, otherwise it is treated as a negative number. If this is the first edge point 15 to be tested, then the largest distance and the smallest distance are both set to the distance amount. Otherwise, the distance amount is compared to both the largest distance and the smallest distance and one of them is set to the new distance. For all of the distances computed from edge points 15(G) to the center line 11A, the absolute value of the smallest distance 23A subtracted from the largest distance 23B is divided by the width 23C of first original polygon 17A, i.e. the length of the line C-E. The result, rounded to the nearest hundredth's place, is the percentage amount that the overlap region covers first original polygon 17A.

temp=abs($Distance_{23B}-Distance_{23A}$)/$length_{C-E}$ percentage=round(temp*100)/100

Alternatively, the projection method can be used to compute the distance from a point to a line for arbitrary geometries because slope-intercept methods can degenerate when there are lines near vertical due to underflow.

$Distance_{proj}$=abs(($D_x-C_x$)*($C_y-E_y$)-($C_x-E_x$)*($D_y-C_y$))/sqrt(($D_x-C_x$)$^2$+($D_y-C_y$)$^2$)

Edge points 15 that have zero distance to line CD or line EF are part of second original polygon 17B. If overlap polygon 19 has edge points 15 on both edges 13 (line CD and line EF) then overlap polygon 19 has 100% overlap. If the overlap is not 100%, then the maximum distance of the distances to the single edge line (CD or EF) that are part of overlap polygon 19 is chosen. The maximum distance is divided by the length of line CE to compute the overlap percentage for overlap polygon 19.

Figure 5:
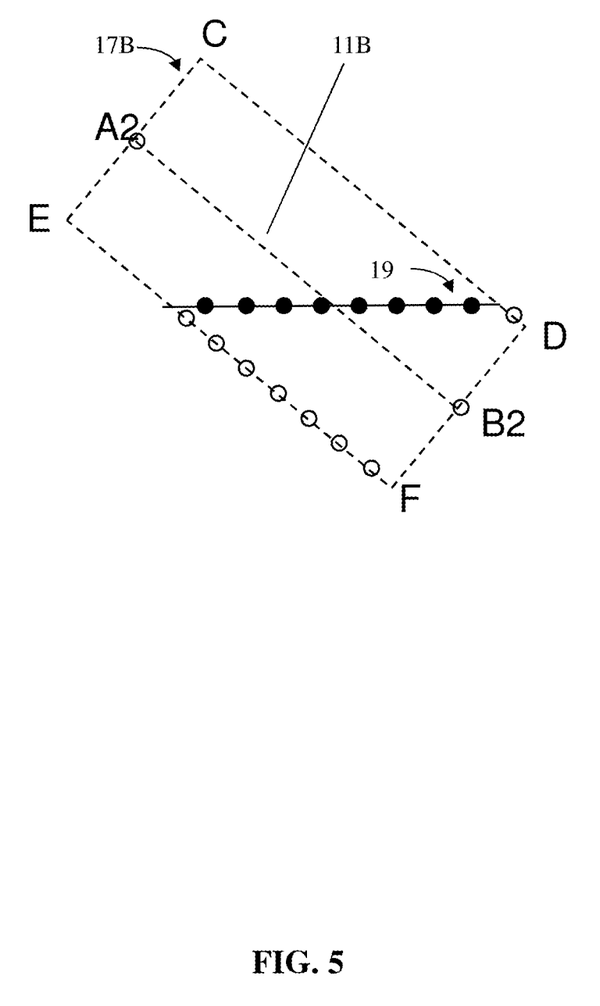
FIG. 5 is a graphic diagram of distance computation parameters derived for a distance computation for the overlap polygon within the other of the original polygons.

Referring now to FIG. 5, the above process is repeated using overlap polygon 19 and second original polygon 17B, and the maximum overlap percentage is chosen. If both of the resulting overlap percentages exceed a pre-selected threshold, then overlap polygon 19 can be placed into an array of overlap polygons for further processing, including, but not limited to, display to a user by drawing the boundaries of overlap polygons 19 on top of the sensor file boundaries. Note that the maximum overlap percentage is that the overlap is at most that value and can be less in different parts of overlap polygon 19. Overlap polygon 19 can be "trimmed" where it has less than a pre-select overlap percentage. The use of overlap polygon 19 versus doing the analysis on a scanline-by-scanline basis results in increased processing speed.

Figure 6:
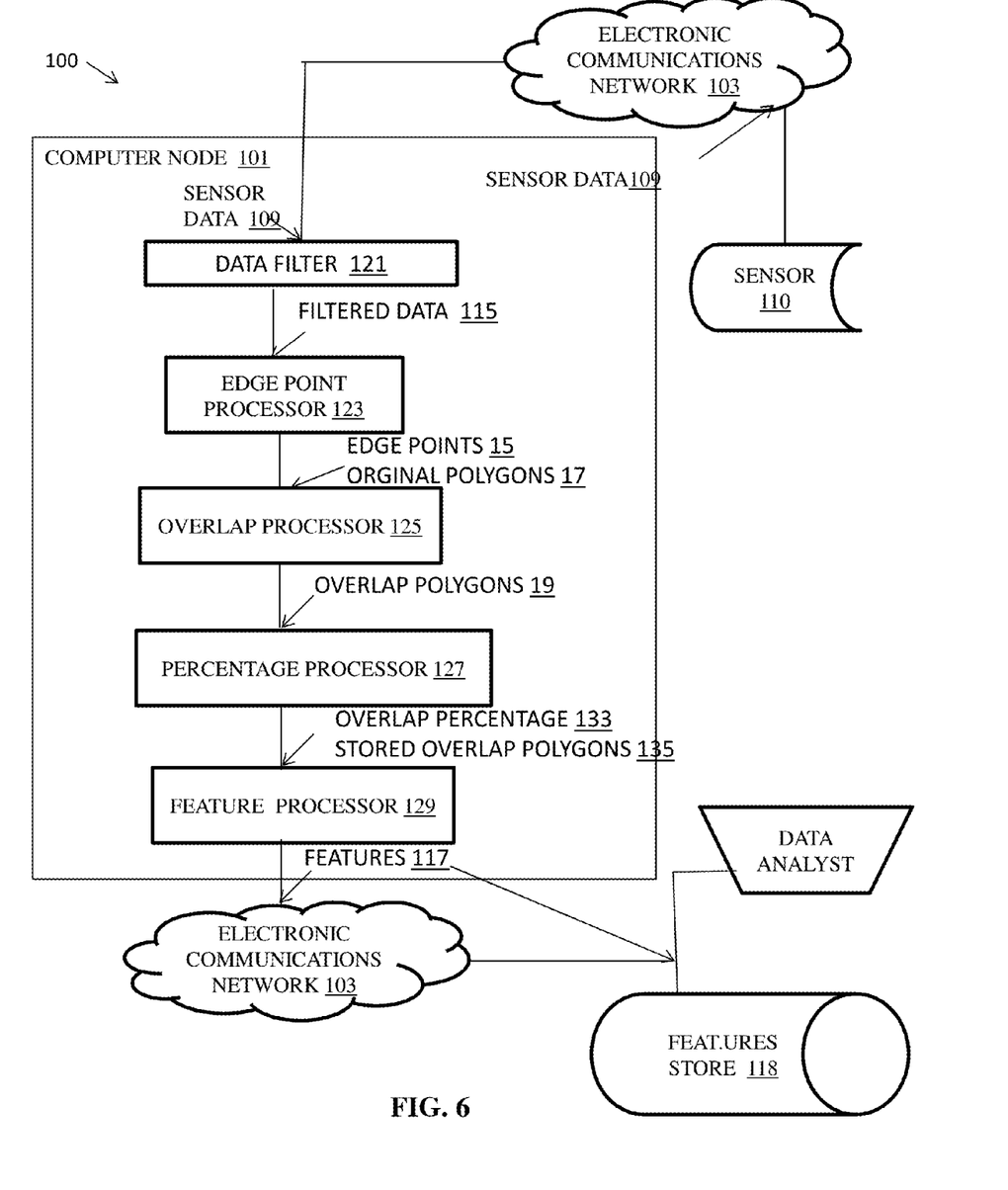
FIG. 6 is a schematic block diagram of the system of one embodiment of the present teachings.

Referring now to FIG. 6, system 100, an embodiment of the present teachings for locating geographic areas where spatial overlap of swath sensor data meets a pre-selected amount of swath width, can include, but is not limited to including, computer node 101 executing processors that receive and process sensor data 109 from sensors 110 and storage of sensor data 109 and supply a data analyst and/or feature data store 118 with feature data 117 through, for example, but not limited to, electronic communications network 103. System 100 can also include data filter 121 automatically filtering the data, and edge point processor 123 automatically determining end points of a navigation track based on filtered data 115. The end points can include a begin time and an end time of the navigation track of a ship. Data filter 121 can optionally include computer code stored on a computer readable medium for breaking the data up into linear segments. Data filter can also optionally include computer code stored on a computer readable medium for eliminating the turns from the navigation tracks.

Continuing to refer to FIG. 6, system 100 can further include edge point processor 123 automatically extracting edge points 15 from filtered data 115 based on navigation track end points, and automatically creating original polygons 17 using positions of edge points 15. Original polygons 17 can each have a swath width. Positions of the edge points can include locations based on the navigation track, the depth of the ocean below the navigation track, and the time when the edge points are each sensed. Edge point processor 123 can optionally include computer code stored on a computer readable medium for locating the edge points that are the furthest away from the navigation track. Edge point processor 123 can further optionally include computer code stored on a computer readable medium for omitting the navigation tracks having a number of consecutive edge points below a pre-selected ping threshold. System 100 can further include overlap polygon processor 125 automatically determining overlap polygons 19 as the spatial intersection of original polygons 17, two at a time, with each other. Overlap polygons 19 can retain a subset of edge points 15 of each of original polygons 17.

Continuing to still further refer to FIG. 6, system 100 can still further include percentage processor 127 automatically computing a first overlap percentage for each overlap polygon 19 with a first of the two original polygons 17. Percentage processor 127 can include computer code on a computer readable medium. The computer code can (1) for the first of original polygons 17, automatically compute the distances from each point in overlap polygon 19 that belongs to the second of the original polygons 17 to both of the edges of the first of the original polygons 17, (2) automatically choose the maximum of the distances, and (3) automatically divide the maximum of the distances by the swath width of the first of the original polygons 17. Percentage processor 127 can also automatically compute a second overlap percentage for each overlap polygon 19 with a second of the two original polygons 17. Percentage processor 127 can include computer code on a computer readable medium. The computer code can (1) for the second of the original polygons 17, automatically compute the distances from each point in the overlap polygon 19 that belongs to the first of the original polygons 17 to both of the edges of the second of the original polygons 17, (2) automatically choose the maximum of the distances, and (3) automatically divide the maximum of the distances by the swath width of the second of the original polygons 17. Percentage processor 127 can still further automatically compute overlap percentage 133 of overlap polygon 19 of the maximum of the first overlap percentage and the second overlap percentage, can automatically store overlap polygon 19 if overlap percentage 133 is at least equal to a pre-selected percentage, and can automatically repeat processing each pair of original polygons 17 in the data. System 100 can also include feature processor 129 automatically analyzing features in the data corresponding to the locations of the stored overlap polygons 135. Percentage processor 127 can compute the distance using a non-degenerate method.

In another embodiment, and continuing to refer to FIG. 6, a system for locating geographic areas where spatial overlap of swath sensor data meets a pre-selected amount of swath width can include data filter 121 automatically reducing the number of scan lines in sensor data 109 by removing turn data and roll excursion data from sensor data 109, data filter 121 also automatically identifying a contiguous series of the reduced scan lines having less than a pre-selected amount of yaw and roll. System 100 can further include edge point processor 123 automatically computing edge point positions for each of the reduced scan lines to create original polygons 17 for each of the contiguous series of the reduced scan lines, original polygons 17 having a series of edge points 15 along opposite edges of original polygons 17, and overlap processor 125 automatically computing overlap polygons 19 by ANDing two of original polygons 17, overlap polygons 19 including overlap polygon edge points from a subset of edge points 15 of the two original polygons 17. System 100 can still further include percentage processor 127 automatically computing first projection distances from each overlap polygon edge point along a perpendicular to the lines defining each edge of a first of the two polygons to the edge points of the first of the two original polygons 17, percentage processor 127 also automatically computing a first overlap percentage based on the maximum of the first projection distances and the length of the line connecting the opposite edges of the first of the two polygons, percentage processor 127 still further automatically computing second projection distances from each of the overlap polygon edge points along a perpendicular to the lines defining each edge of a second of the two original polygons 17 to edge points 15 of the second of the two original polygons 17, percentage processor 127 automatically computing a second overlap percentage based on the maximum of the second projection distance and the length of the line connecting the opposite edges of the second of the two polygons, percentage processor 127 automatically choosing overlap percentage 133 from the first overlap percentage and the second overlap percentage. System 100 can further include feature processor 129 automatically locating the geographic areas based on overlap percentage 133 and the pre-selected amount of swath width.

In yet another embodiment, and still further referring to FIG. 6, a method for examining seafloor features can include, but is not limited to including, the steps of: (a) automatically reducing scan lines by removing turn data and roll excursion data from sensor data 109, (b) automatically identifying a contiguous series of the reduced scan lines having less than a pre-selected amount of yaw and roll, (c) automatically computing end positions for each of the reduced scan lines to create original polygon 17 for each of the contiguous series of the reduced scan lines, the polygon having a series of edge points 15 along opposite edges of original polygon 17, (d) automatically computing overlap polygons 19 by ANDing two of original polygons 17, overlap polygons 19 having overlap edge points from a subset of edge points 15 of original polygons 17, (e) automatically computing first projection distances from each of the overlap edge points to the edge points of a first of the two original polygons, (f) automatically computing a first overlap percentage 133 based on the maximum of the first projection distances and the length of the line connecting the opposite edges of the first of the two original polygons 17, (g) automatically computing second projection distances from each of the overlap edge points to the edge points of a second of the two polygons, (h) automatically computing a second overlap percentage 133 based on the maximum of the second projection distance and the length of the line connecting the opposite edges of the second of the two polygons, (i) automatically choosing a maximum overlap percentage from the first overlap percentage and the second overlap percentage, and (j) automatically examining the seafloor features 117 within the area covered by the overlap polygons 19 when the maximum overlap percentage 133 reaches a pre-selected threshold.

Figure 7A:
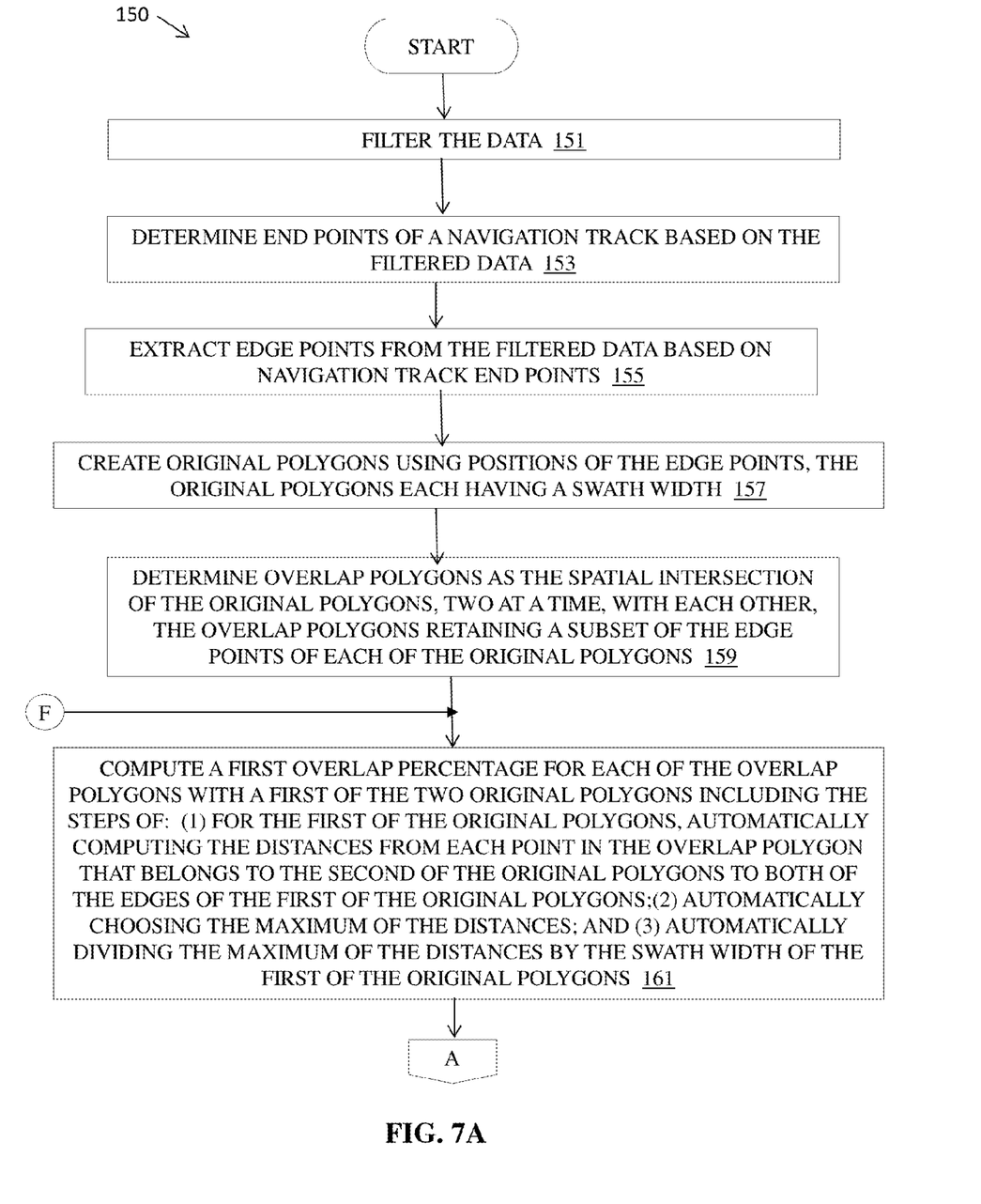
FIGS. 7A and 7B are flowcharts of the method of one embodiment of the present teachings.
Figure 7B:
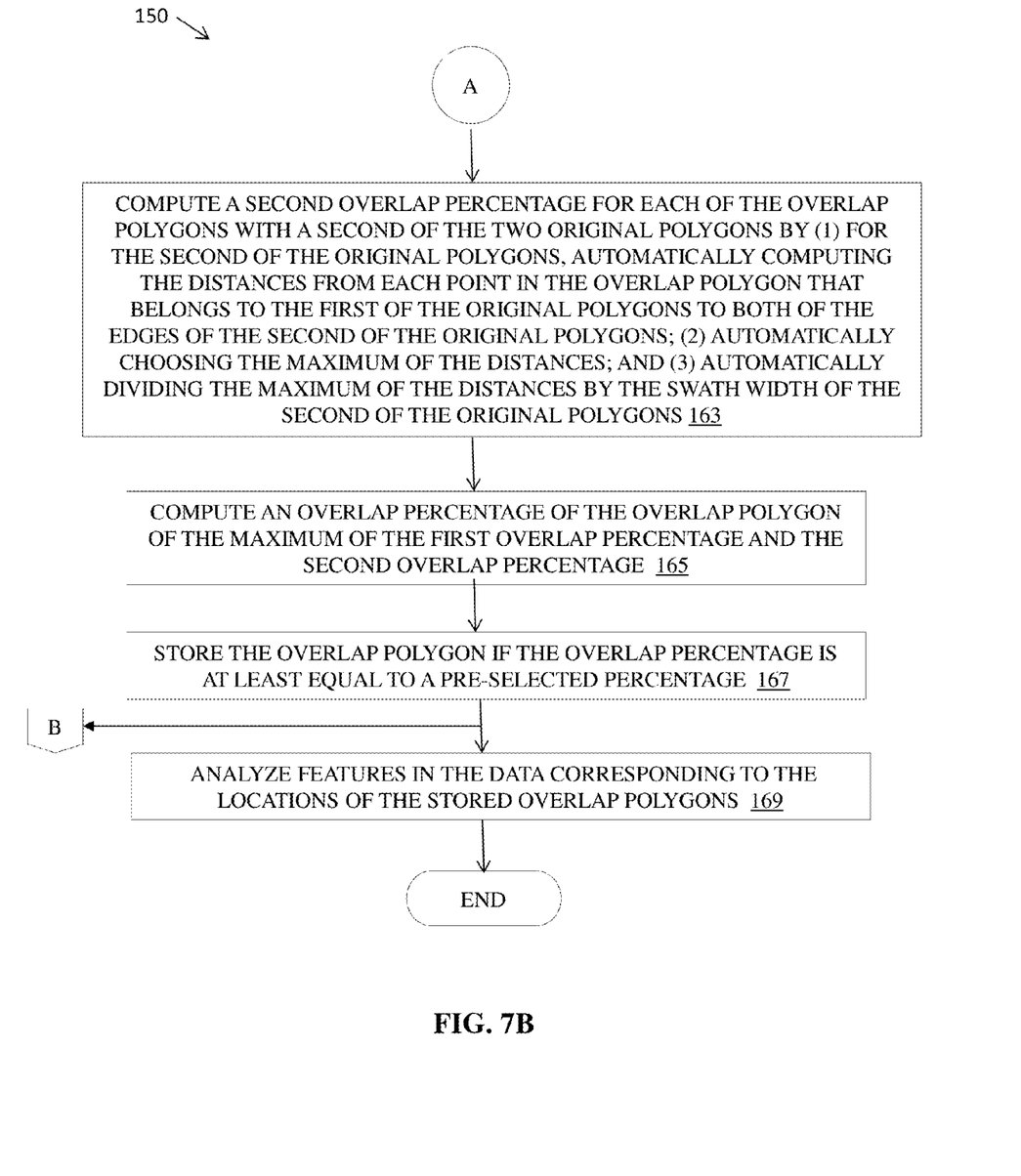

Referring now to FIGS. 7A and 7B, computer method 150 for choosing geographic regions of data in which to analyze features can include, but is not limited to including, the steps of: (a) automatically filtering 151 the data; (b) automatically determining 153 end points of a navigation track based on the filtered data; (c) automatically extracting 155 edge points from the filtered data based on navigation track end points; (d) automatically creating 157 original polygons using positions of the edge points, the original polygons each having a swath width; and (e) automatically determining 159 overlap polygons as the spatial intersection of the original polygons, two at a time, with each other, the overlap polygons retaining a subset of the edge points of each of the original polygons. For each pair of original polygons having overlap polygons, method 150 can execute the steps of (f) automatically computing 161 a first overlap percentage for each of the overlap polygons with a first of the two original polygons including the steps of: (1) for the first of the original polygons, automatically computing the distances from each point in the overlap polygon that belongs to the second of the original polygons to both of the edges of the first of the original polygons; (2) automatically choosing the maximum of the distances; and (3) automatically dividing the maximum of the distances by the swath width of the first of the original polygons; (g) automatically computing 163 a second overlap percentage for each of the overlap polygons with a second of the two original polygons by (1) for the second of the original polygons, automatically computing the distances from each point in the overlap polygon that belongs to the first of the original polygons to both of the edges of the second of the original polygons; (2) automatically choosing the maximum of the distances; and (3) automatically dividing the maximum of the distances by the swath width of the second of the original polygons; (h) automatically computing 165 an overlap percentage of the overlap polygon of the maximum of the first overlap percentage and the second overlap percentage; and (i) automatically 167 storing the overlap polygon if the overlap percentage is at least equal to a pre-selected percentage. Method 150 can further execute the step of (k) automatically analyzing 169 features in the data corresponding to the locations of the stored overlap polygons.

Continuing to refer to FIGS. 7A and 7B, the distances can optionally be computed using a non-degenerate method. The end points can optionally include a begin time and an end time of the navigation track of a ship. The positions of the edge points can optionally be locations based on the navigation track, the depth of the ocean below the navigation track, and the time when the edge points are each sensed. The step of filtering 151 can optionally include the steps of breaking the data up into linear segments, and eliminating the turns from the navigation tracks. The step of extracting 155 edge points can optionally include the steps of locating the edge points that are the furthest away from the navigation track, and omitting the navigation tracks having a number of consecutive edge points below a pre-selected ping threshold.

Raw data and results from the computations of the present embodiment can be stored for future retrieval and processing, printed, displayed, transferred to another computer, and/or transferred elsewhere. Electronic communications 107 (FIG. 6) from which sensor data 109 (FIG. 6) can be received and through which features 117 (FIG. 6) can be transmitted can be wired or wireless, for example, using cellular communication systems, military communications systems, and satellite communications systems. The software for the system is written in a variety of conventional programming languages. The system can operate on a computer having a variable number of CPUs. Other alternative computer platforms can be used. The operating system can be, for example, but is not limited to, WINDOWS® or LINUX®.

The present embodiment is also directed to software for accomplishing the methods discussed herein, and computer readable media storing software for accomplishing these methods. The various modules described herein can be accomplished on the same CPU, or can be accomplished on a different computer. In compliance with the statute, the present embodiment has been described in language more or less specific as to structural and methodical features. It is to be understood, however, that the present embodiment is not limited to the specific features shown and described, since the means herein disclosed comprise preferred forms of putting the present embodiment into effect.

Referring again primarily to FIGS. 7A and 7B, method 150 can be, in whole or in part, implemented electronically. Signals representing actions taken by elements of system 100 (FIG. 6) and other disclosed embodiments can travel over at least one live communications network. Control and data information can be electronically executed and stored on at least one computer-readable medium. The system can be implemented to execute on at least one computer node in at least one live electronic communications network 103 (FIG. 6). Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphs in any form including, but not limited to, Graphic Interchange Format (GIF), Joint Photographic Experts Group (JPEG), Portable Network Graphics (PNG), Scalable Vector Graphics (SVG), and Tagged Image File Format (TIFF).

Although the present teachings have been described with respect to various embodiments, it should be realized these teachings are also capable of a wide variety of further and other embodiments.

What is claimed is:

1. A computer-based method for locating geographic areas where spatial overlap of swath sensor data meets a pre-selected amount of swath width comprising the steps of:
   (a) automatically reducing scan lines by removing turn data and roll excursion data from the sensor data;
   (b) automatically identifying a contiguous series of the reduced scan lines having less than a pre-selected amount of yaw and roll;
   (c) automatically computing edge point positions for each of the reduced scan lines to create original polygons for each of the contiguous series of the reduced scan lines, the original polygons having a series of edge points along opposite edges of the original polygon;
   (d) automatically computing overlap polygons by ANDing two of the original polygons, the overlap polygons including overlap polygon edge points from a subset of the edge points of the two original polygons;
   (e) automatically computing first projection distances from each of the overlap polygon edge points along a perpendicular to the lines defining each edge of a first of the two polygons to the edge points of the first of the two polygons;
   (f) automatically computing a first overlap percentage based on the maximum of the first projection distances and the length of the line connecting the opposite edges of the first of the two polygons;
   (g) automatically computing second projection distances from each of the overlap polygon edge points along a perpendicular to the lines defining each edge of a second of the two polygons to the edge points of the second of the two polygons;
   (h) automatically computing a second overlap percentage based on the maximum of the second projection distance and the length of the line connecting the opposite edges of the second of the two polygons;

(i) automatically choosing a maximum overlap percentage from the first overlap percentage and the second overlap percentage; and
(j) automatically locating the geographic areas based on the maximum overlap percentage and the pre-selected amount of swath width.

2. A computer method for examining seafloor features comprising the steps of:
(a) automatically reducing scan lines by removing turn data and roll excursion data from sensor data;
(b) automatically identifying a contiguous series of the reduced scan lines having less than a pre-selected amount of yaw and roll;
(c) automatically computing end positions for each of the reduced scan lines to create a polygon for each of the contiguous series of the reduced scan lines, the polygon having a series of edge points along opposite edges of the polygon;
(d) automatically computing overlap polygons by ANDing two of the polygons, the overlap polygons having overlap edge points from a subset of the edge points of the two polygons;
(e) automatically computing first projection distances from each of the overlap edge points to the edge points of a first of the two polygons;
(f) automatically computing a first overlap percentage based on the maximum of the first projection distances and the length of the line connecting the opposite edges of the first of the two polygons;
(g) automatically computing second projection distances from each of the overlap edge points to the edge points of a second of the two polygons;
(h) automatically computing a second overlap percentage based on the maximum of the second projection distance and the length of the line connecting the opposite edges of the second of the two polygons;
(i) automatically choosing a maximum overlap percentage from the first overlap percentage and the second overlap percentage; and
(j) automatically examining the seafloor features within the area covered by the overlap polygons when the maximum overlap percentage reaches a pre-selected threshold.

3. A computer method for choosing geographic regions of data in which to analyze features comprising the steps of:
(a) automatically filtering the data;
(b) automatically determining end points of a navigation track based on the filtered data;
(c) automatically extracting edge points from the filtered data based on navigation track end points;
(d) automatically creating original polygons using positions of the edge points, the original polygons each having a swath width;
(e) automatically determining overlap polygons as the spatial intersection of the original polygons, two at a time, with each other, the overlap polygons retaining a subset of the edge points of each of the original polygons;
(f) automatically computing a first overlap percentage for each of the overlap polygons with a first of the two original polygons including the steps of:
(1) for the first of the original polygons, automatically computing the distances from each point in the overlap polygon that belongs to the second of the original polygons to both of the edges of the first of the original polygons;
(2) automatically choosing the maximum of the distances; and
(3) automatically dividing the maximum of the distances by the swath width of the first of the original polygons;
(g) automatically computing a second overlap percentage for each of the overlap polygons with a second of the two original polygons by
(1) for the second of the original polygons, automatically computing the distances from each point in the overlap polygon that belongs to the first of the original polygons to both of the edges of the second of the original polygons;
(2) automatically choosing the maximum of the distances; and
(3) automatically dividing the maximum of the distances by the swath width of the second of the original polygons;
(h) automatically computing an overlap percentage of the overlap polygon of the maximum of the first overlap percentage and the second overlap percentage;
(i) automatically storing the overlap polygon if the overlap percentage is at least equal to a pre-selected percentage;
(j) automatically repeating steps (f)-(i) for each pair of the original polygons in the data; and
(k) automatically analyzing features in the data corresponding to the locations of the stored overlap polygons.

4. The method as in claim 3 wherein the step of computing the distances comprises the step of:
computing the distances using a non-degenerate method.

5. The method as in claim 3 wherein the end points comprise a begin time and an end time of the navigation track of a ship.

6. The method as in claim 3 wherein the positions of the edge points comprise locations based on the navigation track, the depth of the ocean below the navigation track, and the time when the edge points are each sensed.

7. The method as in claim 3 wherein the step of filtering comprises the step of:
breaking the data up into linear segments.

8. The method as in claim 3 wherein the step of filtering comprises the step of:
eliminating the turns from the navigation tracks.

9. The method as in claim 3 wherein the step of extracting edge points comprises the step of:
locating the edge points that are the furthest away from the navigation track.

10. The method as in claim 3 wherein the step of extracting edge points comprises the step of:
omitting the navigation tracks having a number of consecutive edge points below a pre-selected ping threshold.

11. A computer system for choosing geographic regions of data in which to analyze features comprising:
a data filter automatically filtering the data;
a edge point processor automatically determining end points of a navigation track based on the filtered data, the edge point processor automatically extracting edge points from the filtered data based on navigation track end points, the edge point processor automatically creating original polygons using positions of the edge points, the original polygons each having a swath width;
an overlap polygon processor automatically determining overlap polygons as the spatial intersection of the original polygons, two at a time, with each other, the overlap polygons retaining a subset of the edge points of each of the original polygons;
a percentage processor automatically computing a first overlap percentage for each of the overlap polygons with a first of the two original polygons including computer code on a computer readable medium, the computer code executing the steps of (1) for the first of the original polygons, automatically computing the distances from each point in the overlap polygon that belongs to the second of the original polygons to both of the edges of the first of the original polygons, (2) automatically choosing the maximum of the distances, and (3) automatically dividing the maximum of the distances by the swath width of the first of the original polygons; the percentage processor automatically computing a second overlap percentage for each of the overlap polygons with a second of the two original polygons including computer code on a computer readable medium, the computer code executing the steps of (1) for the second of the original polygons, automatically computing the distances from each point in the overlap polygon that belongs to the first of the original polygons to both of the edges of the second of the original polygons, (2) automatically choosing the maximum of the distances, and (3) automatically dividing the maximum of the distances by the swath width of the second of the original polygons, the percentage processor automatically computing an overlap percentage of the overlap polygon of the maximum of the first overlap percentage and the second overlap percentage, the percentage processor automatically storing the overlap polygon if the overlap percentage is at least equal to a pre-selected percentage, the percentage processor automatically repeating processing each pair of the original polygons in the data; and a feature processor automatically analyzing features in the data corresponding to the locations of the stored overlap polygons.

12. The system as in claim 11 wherein the percentage processor computes the distance using a non-degenerate method.

13. The system as in claim 11 wherein the end points comprise a begin time and an end time of the navigation track of a ship.

14. The system as in claim 11 wherein the positions of the edge points comprise locations based on the navigation track, the depth of the ocean below the navigation track, and the time when the edge points are each sensed.

15. The system as in claim 11 wherein the data filter comprises computer code stored on a computer readable medium for breaking the data up into linear segments.

16. The system as in claim 11 wherein the data filter comprises computer code stored on a computer readable medium for eliminating the turns from the navigation tracks.

17. The system as in claim 11 where the edge point processor comprises computer code stored on a computer readable medium for locating the edge points that are the furthest away from the navigation track.

18. The system as in claim 11 wherein the edge point processor comprises computer code stored on a computer readable medium for omitting the navigation tracks having a number of consecutive edge points below a pre-selected ping threshold.

* * * * *